(12) United States Patent
Tetsuka (10) Patent No.: US 7,874,229 B2
(45) Date of Patent: Jan. 25, 2011

(54) BICYCLE HANDLEBAR ASSEMBLY AND BICYCLE BRAKE/DERAILLEUR OPERATING UNIT

(75) Inventor: Toshio Tetsuka, Sakai (JP)

(73) Assignee: Shimano Inc., Osaka (JP)

( * ) Notice: Subject to any disclaimer, the term of this patent is extended or adjusted under 35 U.S.C. 154(b) by 94 days.

(21) Appl. No.: 11/776,728

(22) Filed: Jul. 12, 2007

(65) Prior Publication Data

US 2008/0087131 A1 Apr. 17, 2008

(30) Foreign Application Priority Data

Oct. 13, 2006 (JP) ............................. 2006-279666

(51) Int. Cl.
*F16C 1/10* (2006.01)
*B62K 21/12* (2006.01)
*H01H 9/06* (2006.01)

(52) U.S. Cl. ................... 74/502.2; 74/551.1; 200/61.88

(58) Field of Classification Search ............... 74/502.2, 74/551.1, 489, 488, 551.8; 280/261; 200/61.88
See application file for complete search history.

(56) References Cited

U.S. PATENT DOCUMENTS

| | | | |
|---|---|---|---|
| 4,270,402 A | 6/1981 | Nagano | |
| 5,358,451 A | 10/1994 | Lacombe et al. | |
| 5,470,277 A | 11/1995 | Romano | |
| 5,493,933 A * | 2/1996 | Kelly | ........................... 74/489 |
| 5,653,649 A | 8/1997 | Watarai | |
| 5,881,602 A * | 3/1999 | Cirami | .................... 74/473.14 |
| 6,015,036 A | 1/2000 | Fukuda | |
| 6,073,730 A * | 6/2000 | Abe | ........................ 188/24.11 |
| 6,216,078 B1 | 4/2001 | Jinbo et al. | |
| 6,698,567 B2 * | 3/2004 | Dal Pra' | ..................... 192/217 |
| 6,941,834 B2 | 9/2005 | Irie | |
| 6,991,081 B2 | 1/2006 | Uno et al. | |
| 7,007,785 B2 | 3/2006 | Uno et al. | |
| 7,080,723 B2 | 7/2006 | Uno et al. | |

(Continued)

FOREIGN PATENT DOCUMENTS

CN 1680167 A 10/2005

(Continued)

OTHER PUBLICATIONS

"One-hand Shifting", Apr. 1, 2004, www.campyonly.com/howto/lefthandshifting.html.*

(Continued)

*Primary Examiner*—Thomas R Hannon
*Assistant Examiner*—Phillip A Johnson
(74) *Attorney, Agent, or Firm*—Global IP Counselors, LLP (57) ABSTRACT

A bicycle handlebar assembly is provided with a handlebar, a first gearshift operating part and a second gearshift operating part. The handlebar includes a central portion, a first end portion on a first lateral side of the central portion and a second end portion on a second lateral side of the central portion. The first gearshift operating part is attached to the first end portion of the handlebar with the first gearshift operating part being arranged to electrically control a front derailleur to selectively perform a first gearshift operation. The second gearshift operating part is attached to the first end portion of the handlebar with the second gearshift operating part being arranged to electrically control a rear derailleur to selectively perform a second gearshift operation.

13 Claims, 9 Drawing Sheets

U.S. PATENT DOCUMENTS

| | | |
|---|---|---|
| 2001/0053724 A1 | 12/2001 | Compagnolo |
| 2003/0019712 A1 | 1/2003 | Dal Pra' |
| 2004/0200307 A1 | 10/2004 | Mitchell |
| 2005/0109577 A1* | 5/2005 | Uno et al. ............ 192/217 |

FOREIGN PATENT DOCUMENTS

| | | |
|---|---|---|
| DE | 4022473 A1 | 1/1992 |
| DE | 19642906 A1 | 4/1997 |
| EP | 0 849 150 A2 | 6/1998 |
| EP | 1 188 661 A2 | 3/2002 |
| EP | 1225123 A1 | 7/2002 |
| EP | 1 262 399 A1 | 12/2002 |
| EP | 1473220 A1 | 11/2004 |
| EP | 1 568 597 A1 | 8/2005 |
| EP | 1 582 452 A2 | 10/2005 |
| FR | 2654698 | 5/1991 |

OTHER PUBLICATIONS

Raymond Henry, Du Vélocipède au Dérailleur Moderne, La suprenante histoire des changements de vitesse, Association des amis du Musée d'art et d'industrie de Saint-Étienne, Apr. 2003, Achevé d'imprimer, No. 7948 Les presses de l'Imprimerie Chirat, Saint-Just-La-Pendue, France.

* cited by examiner

BICYCLE HANDLEBAR ASSEMBLY AND BICYCLE BRAKE/DERAILLEUR OPERATING UNIT

CROSS-REFERENCE TO RELATED APPLICATIONS

This application claims priority under 35 U.S.C. §119 to Japanese Patent Application No. 2006-279666, filed Oct. 13, 2006. The entire disclosure of Japanese Patent Application No. 2006-279666 is hereby incorporated herein by reference.

BACKGROUND OF THE INVENTION

1. Field of the Invention

This invention generally relates to a bicycle handlebar assembly and a bicycle brake/derailleur operating unit that can be attached to a bicycle handlebar.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, bicycle gear shifting control systems have been extensively redesigned so as to be electrically operated.

Externally mounted gearshift devices which operate a front derailleur and rear derailleur are known as bicycle gearshift devices. In externally mounted gearshift devices of this type, a gearshift operation is performed as a result of the chain being moved by the front derailleur to one of a plurality of front sprockets that are lined up in the axial direction and mounted on the crank axle, or being moved by the rear derailleur to one of a plurality of rear sprockets that are lined up in the axial direction and mounted on the rear wheel hub shaft. In such externally mounted gearshift devices, gearshift operating parts that can cause an electrically controllable derailleur (which can move the chain by an actuator such as a motor or the like) to perform a gearshift operation have been known in the past (for example, see Japanese Laid-Open Patent Application No. 2005-238873).

Conventional gearshift operating parts are disposed on the base members or brake levers of brake operating devices mounted on both ends of drop-type handlebars, so that operations in two directions, i.e., upshifting and downshifting directions, can be performed by front and rear derailleurs. In particular, the gearshift operating parts have lever members that can swing in both directions from a neutral position. Furthermore, when the lever member is caused to swing in one direction from the neutral position, an upshifting operation of either the front derailleur or rear derailleur can be performed. When the lever member is caused to swing in the other direction, a downshifting operation of the same derailleur can be performed. Such gearshift operating parts are disposed on the left and right brake operating devices. For example, a front gearshift operating part used for upshifting and downshifting of the front derailleur is disposed on the brake operating device on the left side as seen from the rider mounted on the bicycle, while a rear gearshift operating part used for upshifting and downshifting of the rear derailleur is disposed on the brake operating device on the right side.

In the conventional construction described above, the gearshift operating parts for the front derailleur and the rear derailleur are divided on the left and right. Accordingly, in cases where it is necessary to downshift or upshift both derailleurs, both the left and right gearshift operating parts must be operated. Such an operation is especially difficult to understand for a beginner, so that there is a danger that an erroneous gearshift operation will be performed.

Furthermore, in the conventional construction described above, the gearshift operating parts are disposed on the brake operating devices; accordingly, in cases where there is a plurality of positions in which the handlebars are gripped, as in drop-type handlebars, there may be instances in which a gearshift operation is difficult to perform when the handlebars are gripped in a certain position. For example, when the handlebars are gripped further toward the distal ends than the bent position, and an attempt is made to upshift immediately before the finish line in a race, the distance to the brake operating devices is increased, so that the gearshift operating parts are difficult to operate.

In view of the above, it will be apparent to those skilled in the art from this disclosure that there exists a need for an improved gearshift operating arrangement. This invention addresses this need in the art as well as other needs, which will become apparent to those skilled in the art from this disclosure.

SUMMARY OF THE INVENTION

One object of the present invention is to prevent an erroneous operation of the gearshift operating parts of electrically controllable derailleurs.

It is another object of the present invention is to facilitate the operation of electrically controllable derailleurs even in cases where the areas in the vicinity of the distal ends of the handlebars are gripped.

The foregoing object can basically be attained according to a first aspect by providing a bicycle shifting control apparatus for operating an electrically controllable front derailleur between a plurality of sprockets. In accordance with the first aspect, the bicycle handlebar assembly basically comprises a handlebar, a first gearshift operating part and a second gearshift operating part. The handlebar includes a central portion, a first end portion on a first lateral side of the central portion and a second end portion on a second lateral side of the central portion. The first gearshift operating part is attached to the first end portion of the handlebar with the first gearshift operating part being arranged to electrically control a front derailleur to selectively perform a first gearshift operation. The second gearshift operating part is attached to the first end portion of the handlebar with the second gearshift operating part being arranged to electrically control a rear derailleur to selectively perform a second gearshift operation.

In this handlebar assembly, the front derailleur can be caused to perform a gearshift operation when the first gearshift operating part is operated, and the rear derailleur can be caused to perform a gearshift operation when the second gearshift operating part, which is disposed on the same side of the handlebar, is operated. Here, since the front and rear derailleurs can be caused to perform gearshift operations on the same side of the handlebar, the upshifting and downshifting gearshift directions can be handled on the same side of the handlebar. Accordingly, even a beginner is prevented from erroneously operating the gearshift operating parts.

The bicycle handlebar assembly according to a second aspect of the present invention is the assembly according to the first aspect of the present invention wherein the assembly further comprises a brake operating device attached to the first end portion of the handlebar with the brake operating device being arranged to perform a braking operation, with the first and second gearshift operating parts being attached to the brake operating device. In this case, since the two gearshift operating parts are disposed on the brake operating device, gearshift operations can easily be performed by the hand gripping the brake operating device.

The bicycle handlebar assembly according to a third aspect of the present invention is the assembly of the first aspect of the present invention wherein the assembly further comprises a brake operating device attached to the first end portion of the handlebar with the brake operating device being arranged to perform a braking operation, with the first and second gearshift operating parts being attached at positions that are separate from the brake operating device. In this case, since the two gearshift operating parts are disposed in positions that are separated from the brake operating device, a gearshift operation can easily be performed even if the handlebar is gripped in a position separated from the brake operating device.

The bicycle handlebar assembly according to a fourth aspect of the present invention is the assembly of the first aspect of the present invention wherein the assembly further comprises a brake operating device attached to the first end portion of the handlebar with the brake operating device being arranged to perform a braking operation, with one of the first and second gearshift operating parts being attached to the brake operating device and the other of the first and second gearshift operating parts being attached at a position that is separate from the brake operating device. In this case, one gearshift operating part can easily be operated by the hand gripping the brake operating device, and the other gearshift operating part can easily be operated by the hand gripping the handlebar.

The bicycle handlebar assembly according to a fifth aspect of the present invention is the assembly of any of the first through fourth aspects of the present invention wherein the first gearshift operating part is arranged to at least perform the first gearshift operation in an upshifting direction of the front derailleur; and the second gearshift operating part is arranged to perform the second gearshift operation in the upshifting direction of the rear derailleur. In this case, since the gearshifting directions of the front and rear derailleurs are the same, there tends to be no mistaking of the gearshift operation.

The bicycle handlebar assembly according to a sixth aspect of the present invention is the assembly of any of the first through fifth aspects of the present invention wherein the first gearshift operating part is arranged to only perform the first gearshift operation in the upshifting direction of the front derailleur; and the second gearshift operating part is arranged to only perform the second gearshift operation in the upshifting direction of the rear derailleur. In this case, since both the front and rear derailleurs can shift only in the upshifting direction, erroneous operation of the gearshift operating parts is further prevented.

The bicycle handlebar assembly according to a seventh aspect of the present invention is the assembly of the second aspect of the present invention wherein the brake operating device includes a base member attached to the handlebar, and a brake lever with a base end is pivotally attached to the base member, the first gearshift operating part is disposed on the base member, and the second gearshift operating part is disposed in close proximity to the brake lever. In this case, both gearshift operating parts can easily be operated when the base member is gripped.

The bicycle handlebar assembly according to an eighth aspect of the present invention is the assembly of any one of the first through seventh aspects of the present invention wherein the assembly further comprises a third gearshift operating part attached to the second end portion of the handlebar with the third gearshift operating part being arranged to electrically control the front derailleur to selectively perform a third gearshift operation; and a fourth gearshift operating part attached to the second end portion of the handlebar with the fourth gearshift operating part being arranged to electrically control the rear derailleur to selectively perform a fourth gearshift operation. In this case, for example, the gearshift direction of the front and rear derailleurs controlled by the first and second gearshift operating parts can be uniformly set as the upshifting or downshifting direction, and the gearshift direction controlled by the third and fourth gearshift operating parts can be uniformly set as the opposite direction. In other words, the gearshift directions of the front and rear derailleurs can be made uniform on both sides of the handlebar.

The bicycle handlebar assembly according to a ninth aspect of the present invention is the assembly of the eighth aspect of the present invention wherein the third gearshift operating part is arranged to at least perform the third gearshift operation in a downshifting direction of the front derailleur; and the fourth gearshift operating part is arranged to at least perform the fourth gearshift operation in a downshifting direction of the rear derailleur. In this case, gearshift operations in the downshifting direction can be performed on the same side of the handlebar.

The bicycle handlebar assembly according to a tenth aspect of the present invention comprises a handlebar, a brake operating device and a gearshift operating part. The handlebar includes a central portion, a first end portion on a first lateral side of the central portion and a second end portion on a second lateral side of the central portion. The brake operating device includes a base member attached to the first end portion of the handlebar, and a brake lever with a base end is pivotally attached to the base member. The gearshift operating part is attached to the handlebar between a free end of the first end portion of the handlebar and an attachment position of the base member with the gearshift operating part being arranged to electrically control an electrically controllable derailleur to perform a gearshift operation.

In this handlebar assembly, since the gearshift operating part is attached to the handlebar between the first end portion of the handlebar and the attachment position of the base member, the rider can operate the gearshift operating part with the fingers of the hand while gripping the area between the distal end of the handlebar and the attachment position of the base member. Accordingly, the gearshift operating part can be operated even while gripping the area in the vicinity of the distal end of the handlebar, as during a sprint immediately prior to the finish line.

The bicycle handlebar assembly according to an eleventh aspect of the present invention is the assembly of the tenth aspect of the present invention wherein the handlebar is a drop-type handlebar with the first end portion being a curved part in which the gearshift operating part is attached. In this case, the gearshift operating part can be operated even while the area in the vicinity of the distal ends of the drop-type handlebar, i.e., the gripping part on the underside of the drop-type handlebar, is being gripped.

The bicycle handlebar assembly according to a twelfth aspect of the present invention is the assembly of the tenth or eleventh aspect of the present invention wherein the gearshift operating part includes an attachment member fastened to the first end portion of the handlebar, and a rider operating member disposed on the attachment member. In this case, since the gearshift operating part is divided into an attachment member and an operating part, the position of the operating part on the handlebar can easily be adjusted as desired by the rider.

The bicycle handlebar assembly according to a thirteenth aspect of the present invention is the assembly of any one of the tenth through twelfth aspects of the present invention wherein the gearshift operating part is arranged to at least perform the gearshift operation in an upshifting direction of the electrically controllable derailleur. In this case, the upshifting operation of the rear derailleur, which is frequently used during sprints immediately prior to the finish line or the like, can easily be performed even while the area in the vicinity of the distal ends of the handlebars is gripped.

The bicycle handlebar assembly in a fourteenth aspect of the present invention is the assembly of any one of the tenth through thirteenth aspects of the present invention wherein the gearshift operating part is arranged to only perform the gearshift operation in an upshifting direction of the electrically controllable derailleur. In this case, when the gearshift operating part is operated, an upshifting operation of the derailleur can be reliably performed. Accordingly, an upshifting operation can easily be performed without any erroneous operation even when the area in the vicinity of the distal ends of the handlebars is gripped.

The bicycle brake operating device according to a fifteenth aspect of the present invention is a bicycle brake operating device which can be attached to the handlebar of a bicycle, wherein the device comprises a base member, a brake lever, a first gearshift operating part and a second gearshift operating part. The base member is configured to be attached to a bicycle handlebar. The brake lever is pivotally connected to the base member. The first gearshift operating part is disposed on one of the base member and the brake lever, the first gearshift operating part being arranged to electrically control a front derailleur to selectively perform a first gearshift operation. The second gearshift operating part is disposed on one of the base member and the brake lever, the second gearshift operating part being arranged to electrically control a rear derailleur to selectively perform a second gearshift operation.

In this brake operating device, the first and second gearshift operating parts are disposed on the base member, which can be attached to the handlebar, or on the brake lever connected to the base member. This first gearshift operating part can cause the front derailleur to perform a gearshift operation, and the second gearshift operating part can cause the rear derailleur to perform a gearshift operation. Here, since two gearshift operating parts that can cause the front and rear derailleurs to perform gearshift operations are disposed on a single brake operating device, the front and rear derailleurs can be caused to perform gearshift operations on the same side of the handlebar. Furthermore, for example, the gearshift direction of both derailleurs can be set as upshifting or downshifting, and erroneous operation of the gearshift operating parts is therefore less likely to occur.

The bicycle brake operating device according to a sixteenth aspect of the present invention is the device of the fifteenth aspect of the present invention wherein the first gearshift operating part is arranged to at least perform the first gearshift operation in an upshifting direction of the front derailleur; and the second gearshift operating part is arranged to perform the second gearshift operation in the upshifting direction of the rear derailleur. In this case, the gearshift direction of the front and rear derailleurs is uniform, and erroneous gearshift operation is therefore less likely to occur.

The bicycle brake operating device according to a seventeenth aspect of the present invention is the device of the sixteenth aspect of the present invention wherein the first gearshift operating part is arranged to only perform the first gearshift operation in the upshifting direction of the front derailleur; and the second gearshift operating part is arranged to only perform the second gearshift operation in the upshifting direction of the rear derailleur. In this case, since both the front and rear derailleurs can be shifted only in the upshifting direction, erroneous operation of the gearshift operating parts is even less likely to occur.

The bicycle brake operating device according to an eighteenth aspect of the present invention is the device of any one of the fifteenth through seventeenth aspects of the present invention wherein the first gearshift operating part is disposed on the base member; and the second gearshift operating part is disposed in close proximity to the brake lever. In this case, both gearshift operating parts can easily be operated when the base member is gripped.

In the bicycle handlebar assembly and brake operating device of the present invention, the front and rear derailleurs can be caused to perform gearshift operations on the same side of the handlebar. Furthermore, since the gearshift direction can be uniformly set as the upshifting direction or downshifting direction on the same side of the handlebar, erroneous operation of the gearshift operating parts is less likely to occur.

In the bicycle handlebar assembly of another aspect of the present invention, the gearshift operating parts are disposed in positions close to the distal ends of the handlebar. Accordingly, the gearshift operating parts can be operated even while gripping the areas in the vicinity of distal ends of the handlebar, as in a sprint immediately before the finish line.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
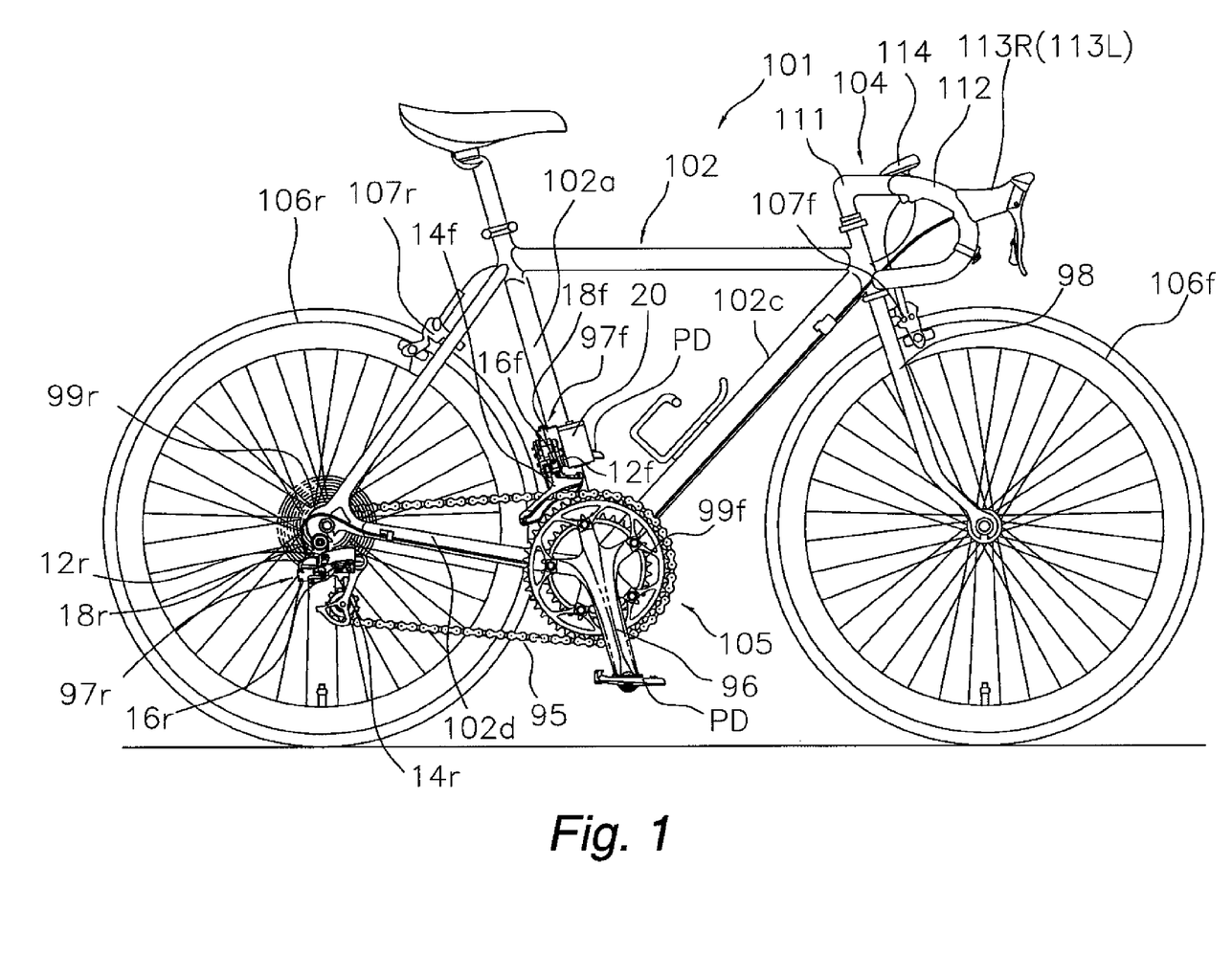
FIG. 1 is a side elevational view of a bicycle having a gear shifting control system with a pair of bicycle brake/derailleur operating units in accordance with a first embodiment of the present invention.

Referring initially to FIG. 1, a bicycle 101 is illustrated in accordance with a first embodiment of the present invention. FIG. 1 shows a bicycle 101 in which an embodiment of the present invention is employed. The bicycle 101 is a "road racer" (racing style road bike). The bicycle 101 basically includes a diamond-shaped frame 102 having a front fork 98, a handlebar unit 104 fastened to the front fork 98, a drive unit 105, a front wheel 106f mounted to the front fork 98 and a rear wheel 106r mounted to a rear portion of the frame 102. The drive unit 105 basically includes a chain 95, a crank 96 on which pedals PD are mounted, a motorized front derailleur 97f, a motorized rear derailleur 97r, a front sprocket cluster 99f, and a rear sprocket cluster 99r. The rear and front derailleurs 97r and 97f are examples of bicycle gear changing devices in accordance with one embodiment. The bicycle 101 also includes a front brake device 107f, a rear brake device 107r, and a pair (right and left) brake/derailleur operating units 113R and 113L. The right brake/derailleur operating unit 113R is configured to control both the front and rear derailleur 97f and 97r to selectively perform gearshift operations in the upshifting direction. The right brake/derailleur operating unit 113R is configured to control the rear brake device 107r to selectively perform a braking operation. The left brake/derailleur operating unit 113L is configured to control both the front and rear derailleur 97f and 97r to selectively perform gearshift operations in the downshifting direction. The left brake/derailleur operating unit 113L is configured to control the front brake device 107f to selectively perform a braking operation. The rear and front derailleurs 97r and 97f are examples of bicycle gear changing devices in accordance with one embodiment.

Figure 2:
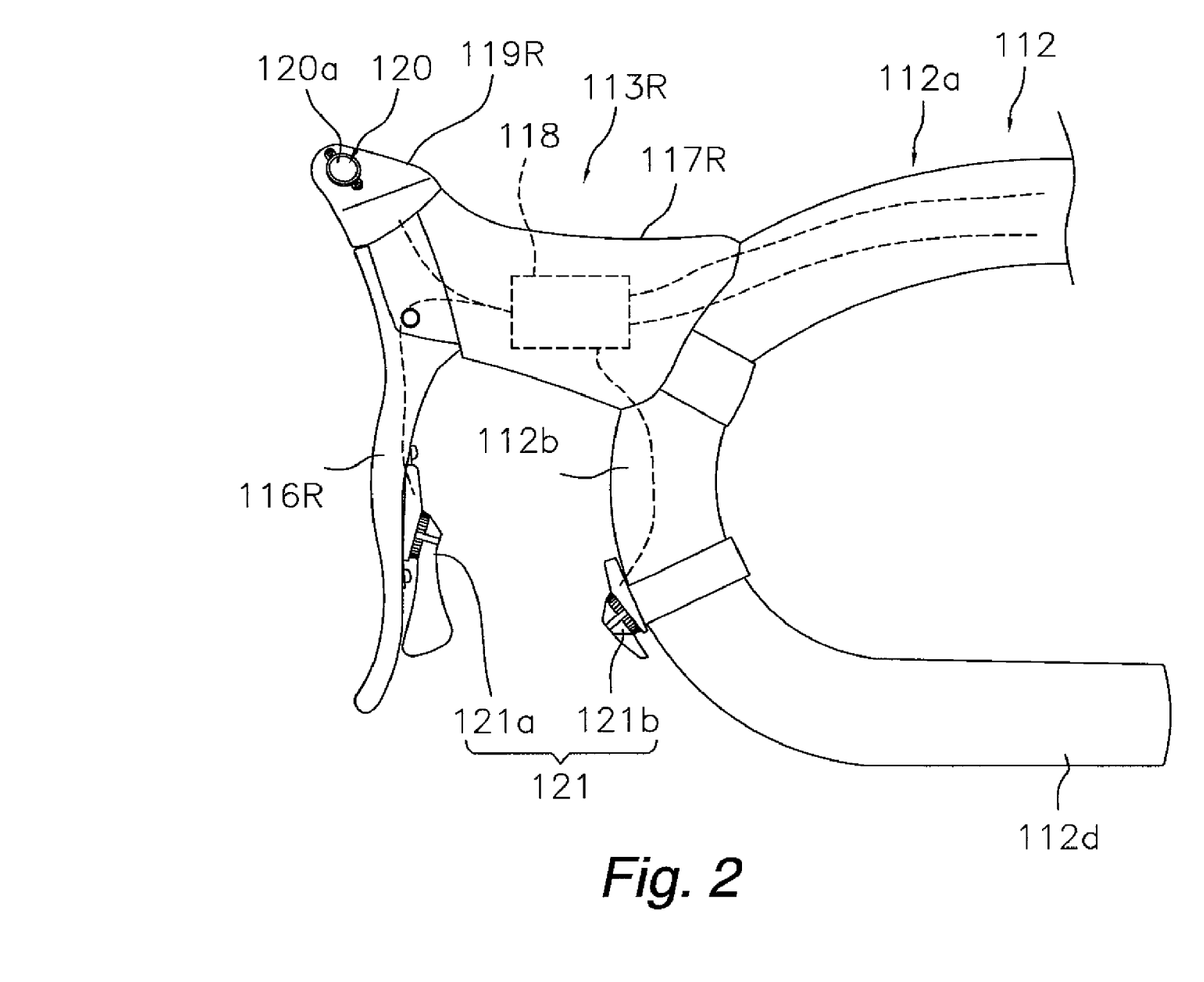
FIG. 2 is an enlarged, side elevational view of the area of the right end of the handlebar with the right brake/derailleur operating unit.
Figure 3:
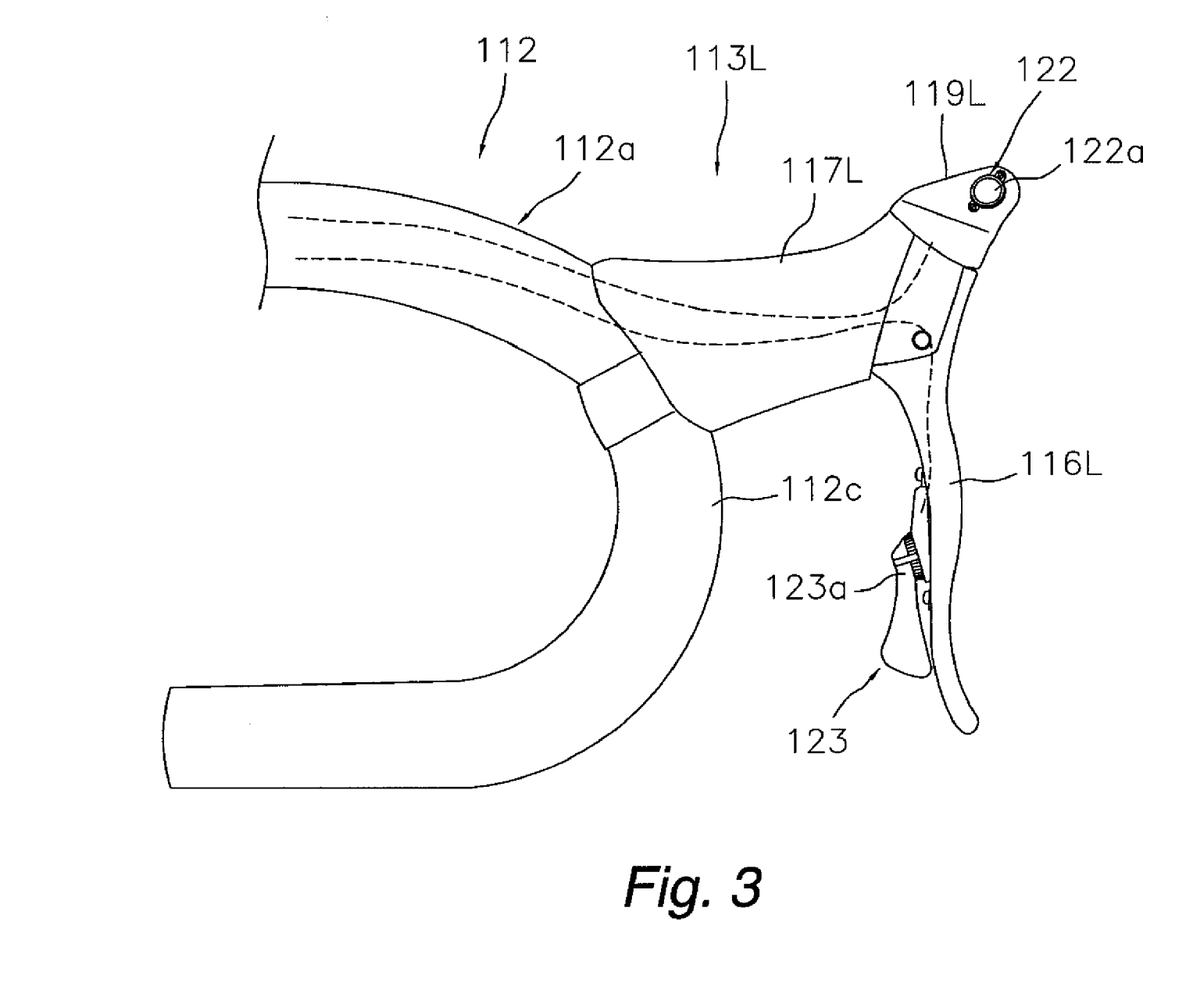
FIG. 3 is an enlarged, side elevational view of the area of the left end of the handlebar with the left brake/derailleur operating unit.
Figure 4:
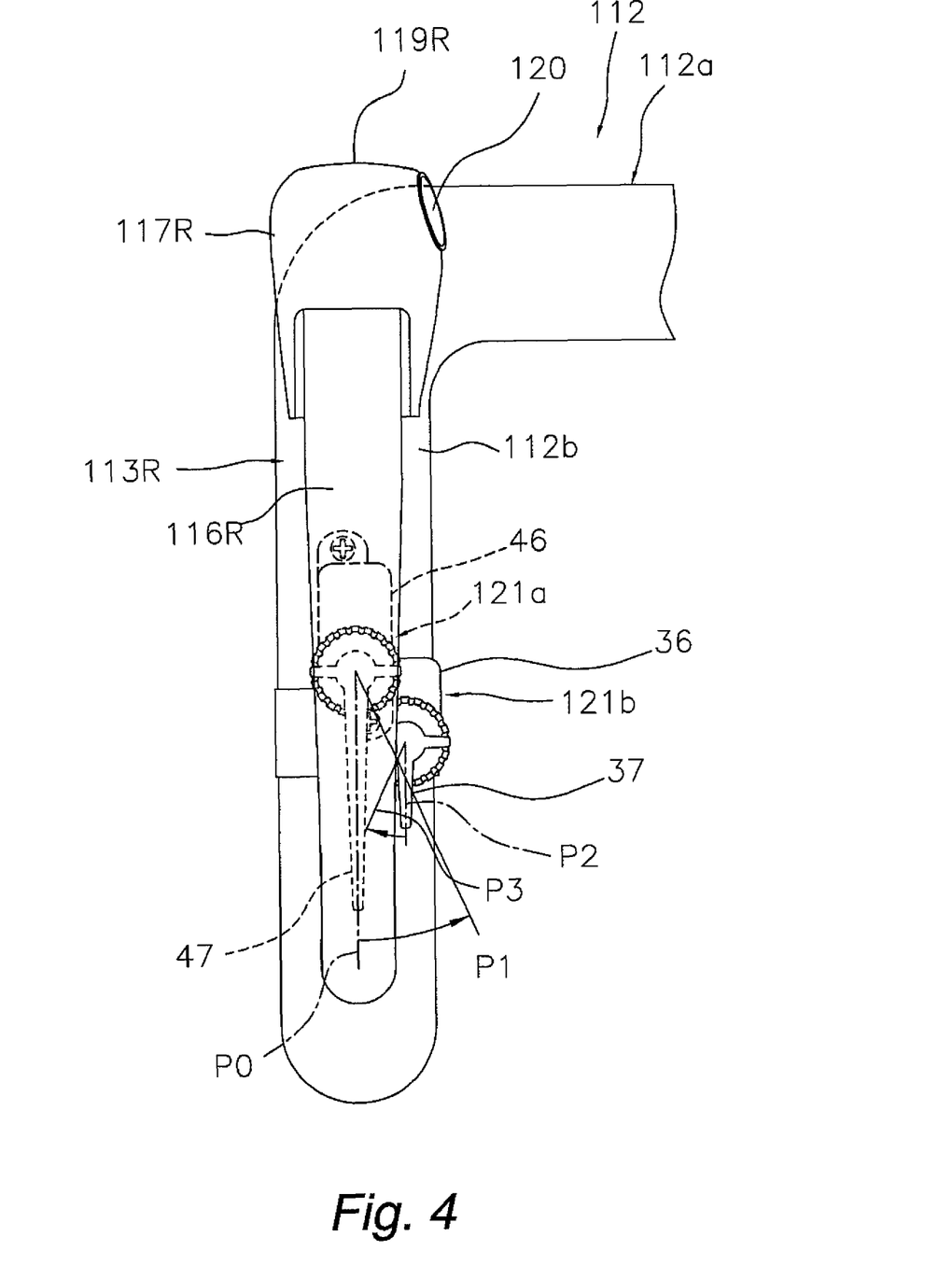
FIG. 4 is an enlarged front elevational view of the area of the right end of the handlebar with the right brake/derailleur operating unit.
Figure 5:
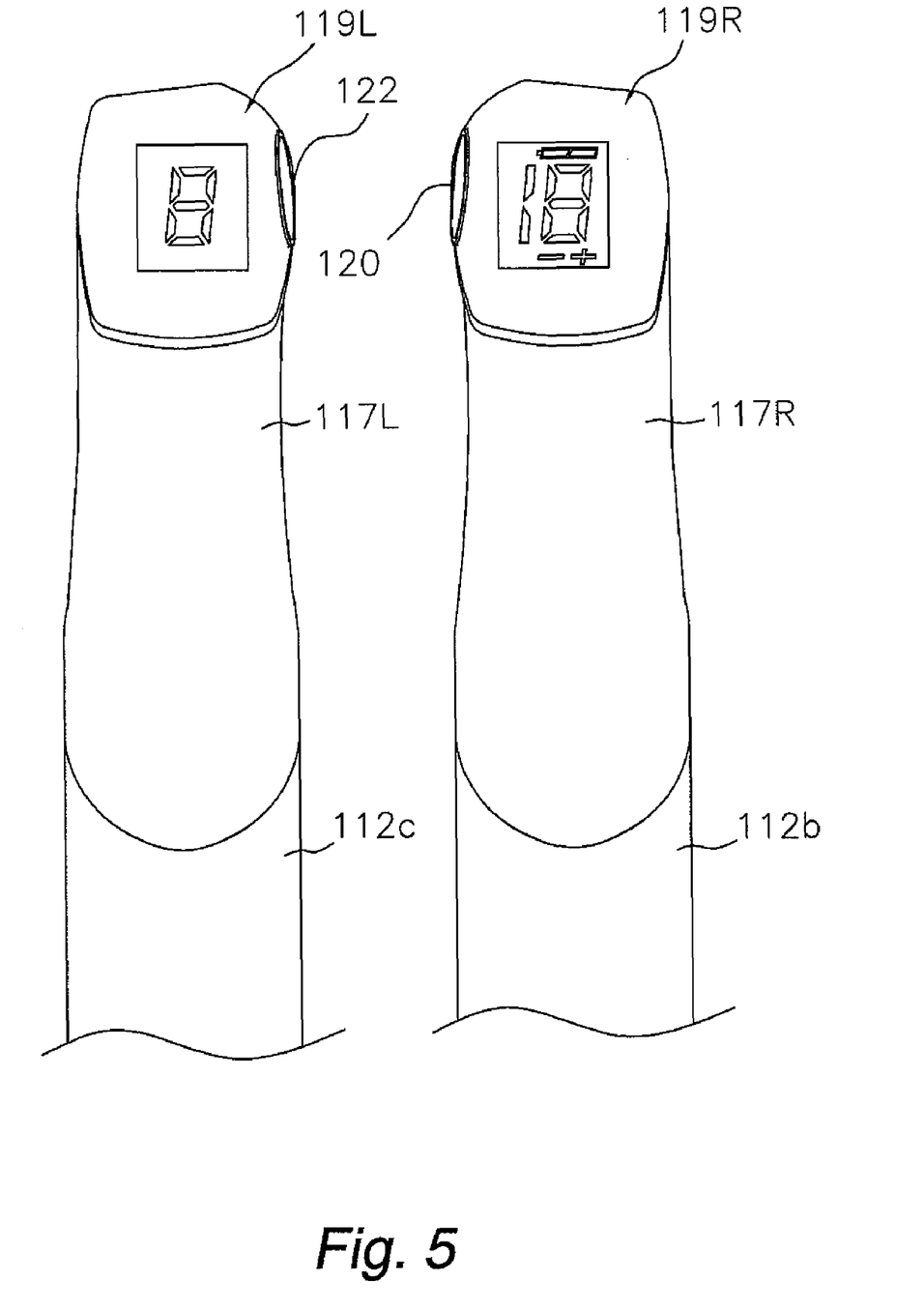
FIG. 5 is an enlarged top plan view of the areas around both of the curved parts of the handlebar with the brake/derailleur operating units.

The handlebar unit 104 comprises a handlebar stem 111 and a handlebar 112 that is fitted into and fastened to the upper end of the handlebar stem 111 as shown in FIG. 1. The handlebar stem 111 is fitted into and fastened to the upper part of the front fork 98. The handlebar 112 is a drop-type handlebar having a handlebar main body 112a, a pair of U-shaped curved parts 112a and 112b on opposite ends of the handlebar main body 112a. The handlebar main body 112a forms a central portion of the handlebar 112, while the U-shaped curved parts 112a and 112b forms first and second end portions of the handlebar 112. The curved parts 112a and 112b are arranged such that the curved portions thereof protrude in the forward direction. The brake/derailleur operating units 113R and 113L are mounted on the handlebar 112. The brake/derailleur operating unit 113R is arranged on the right-hand end of the handlebar 112 when the bicycle 101 is viewed from the rear. The brake/derailleur operating unit 113L is arranged on the left-hand end when the bicycle 101 is viewed from the rear. As shown in FIGS. 2 through 4, the handlebar 112 together with the brake/derailleur operating units 113R and 113L constitute a handlebar assembly 112.

The brake/derailleur operating units 113R and 113L are connected to the rear and front brake devices 107r and 107f, respectively, with Bowden-type brake cables (not shown). The brake/derailleur operating units 113r and 113f are also connected to the rear and front derailleurs 97r and 97f, respectively, with electrical wires. A cycle computer 114 is configured to display speed and traveled distance of the bicycle is arranged in a middle portion of the central part of the handlebar 112. Thus, the cycle computer 114 functions as a speed indicator.

As shown in FIG. 2, the brake/derailleur operating unit 113R has a base member or brake bracket 117R mounted on the curved part 112c of the handlebar 112 and a brake lever 116R pivotally disposed on the brake bracket 117R. The brake lever 116R controllably operates the rear brake device 107r. The brake bracket 117R and the brake lever 116R constitute a rear brake operating device. The brake/derailleur operating unit 113R is provided with a first gearshift operating part 120 and a second gearshift operating part 122, which are examples of gear shifters in accordance with one embodiment.

The first gearshift operating part 120 is attached to a first end portion (i.e., the curved part 112b) of the handlebar main body 112a (on the right side as seen from the rear of the bicycle, i.e., on the right side as seen from the rider). The first gearshift operating part 120 is configured and arranged to operate the front derailleur 97f to perform a gearshift operation in the upshifting direction. The second gearshift operating part 121 is attached to the first end portion (i.e., the curved part 112b) of the handlebar main body 112a. The second gearshift operating part 121 is configured and arranged to operate the rear derailleur 97r to perform a gearshift operation in the upshifting direction. Also, the brake/derailleur operating unit 113R is provided with a gear position display device 119R, which has a liquid crystal display for showing, for example, the shifted positions. The gear position display device 119R is fixed on an upper side of a distal end of the brake bracket 117R.

As shown in FIG. 3, the brake/derailleur operating unit 113L has a base member or brake bracket 117L mounted on the curved part 112c of the handlebar 112 and a brake lever 116L pivotally disposed on the brake bracket 117L. The brake lever 116L controllably operates the front brake device 107f. The brake bracket 117L and the brake lever 116L constitute a front brake operating device. The brake/derailleur operating unit 113L is provided with a third gearshift operating part 122 and a fourth gearshift operating part 123, which are examples of gear shifters in accordance with one embodiment.

The third gearshift operating part 122 is attached to a second end portion (i.e., the curved part 112c) of the handlebar main body 112a (on the left side as seen from the rear of the bicycle, i.e., on the left side as seen from the rider. The third gearshift operating part 122 is configured and arranged to operate the front derailleur 97f to perform a gearshift operation in the downshifting direction. The fourth gearshift operating part 123 is attached to the second end portion of the handlebar main body 112a. The fourth gearshift operating part 123 is configured and arranged to operate the rear derailleur 97r to perform a gearshift operation in the downshifting direction. Also, the brake/derailleur operating unit 113L is provided with a gear position display device 119L, which has a liquid crystal display for showing, for example, the shifted positions. The gear position display device 119LR is fixed on an upper side of a distal end of the brake bracket 117L.

In the illustrated embodiment, the first gearshift operating part 120 includes a pushbutton-type first switching member 120a. The first switching member 120a is disposed on the inside surface (i.e., "inside" indicates the direction toward the central part of the handlebar) of the distal end part of the base member 117R in the vicinity of the first-end curved part 112b of the handlebar main body 112a.

In the illustrated embodiment, the second gearshift operating part 121 includes a lever-type second switching member 121a and a lever-type third switching member 121b. The second switching member 121a is attached to the rear surface of the brake lever 116R. The third switching member 121b is attached to the curved part 112b of the handlebar main body 112a. The third switching member 121b is disposed on the curved part 112b of the handlebar main body 112a between the distal end 112d on the first lateral side of the handlebar main body 112a and the attachment position of the base member 117R, in a position that is separated from the brake operating device 113R.

In the illustrated embodiment, the third gearshift operating part 122 includes a pushbutton-type fourth switching member 122a. The fourth switching member 122a is attached to the inside surface of the distal end part of the base member 117L in the vicinity of the curved part 112c on the side of the second end portion of the handlebar main body 112a.

In the illustrated embodiment, the fourth gearshift operating part 123 includes a lever-type fifth switching member 123a. The fifth switching member 123a is attached to the rear surface of the brake lever 116L.

Figure 6:
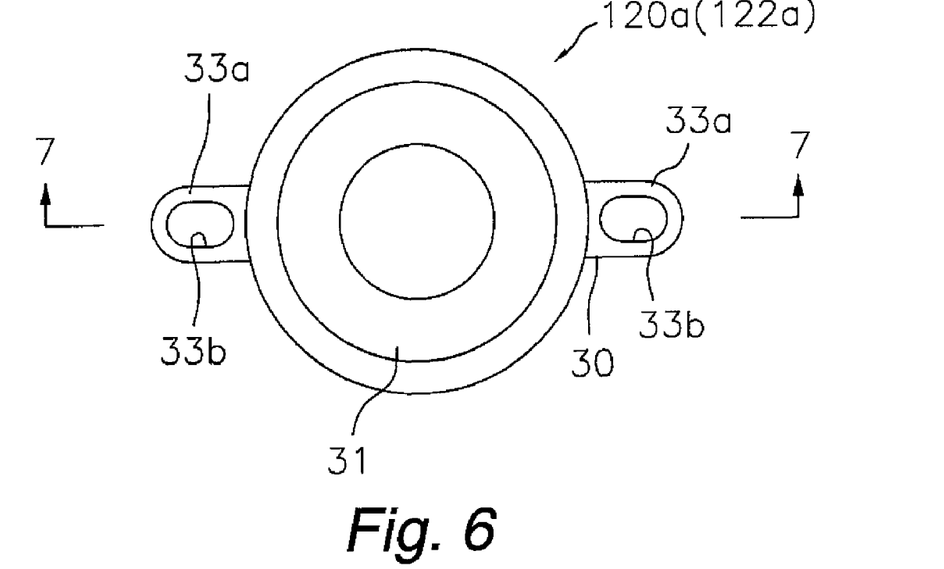
FIG. 6 is a side elevational view of one the first and fourth switching members of the brake/derailleur operating units.

As shown in FIG. 6, the pushbutton-type first switching member 120a (or fourth switching member 122a) has an attachment member 30 which is fastened to the base member 117R (or base member 117L), a pushbutton-type operating part 31 which is mounted on the attachment member 30 so that this part 31 is free to move, and a switching part 32 using, e.g., a tactile switch which is pushed by the operating part. The attachment member 30 comprises a first case member 33 which has two attachment ear parts 33a that protrude in the diameter direction, and a second case member 34 which is fastened to the first case member 33.

Each of the attachment car parts 33a has a slot 33b through which fastening spring members can pass. The first switching member 120a (or fourth switching member 122a) is fastened to the base member 117R (or base member 117L) by passing a spring member through the slot 33b, and screwing this spring member into the base member 117R (or base member 117L). For example, as shown in FIGS. 2 and 3, the attachment ear parts 33a that have these slots 33b are disposed at an inclination so that these parts drop downward toward the rear. As a result, the first switching member 120a (or fourth switching member 122a) is fastened at an inclination so that the position is adjustable. For example, it is preferable that the range over which the position is adjustable be about 3 mm to 10 mm. The first switching member 120a (or fourth switching member 122a) used for upshifting (or downshifting) can thereby be disposed in accordance with the size of the rider's hand or the preferences of the rider.

Figure 7:
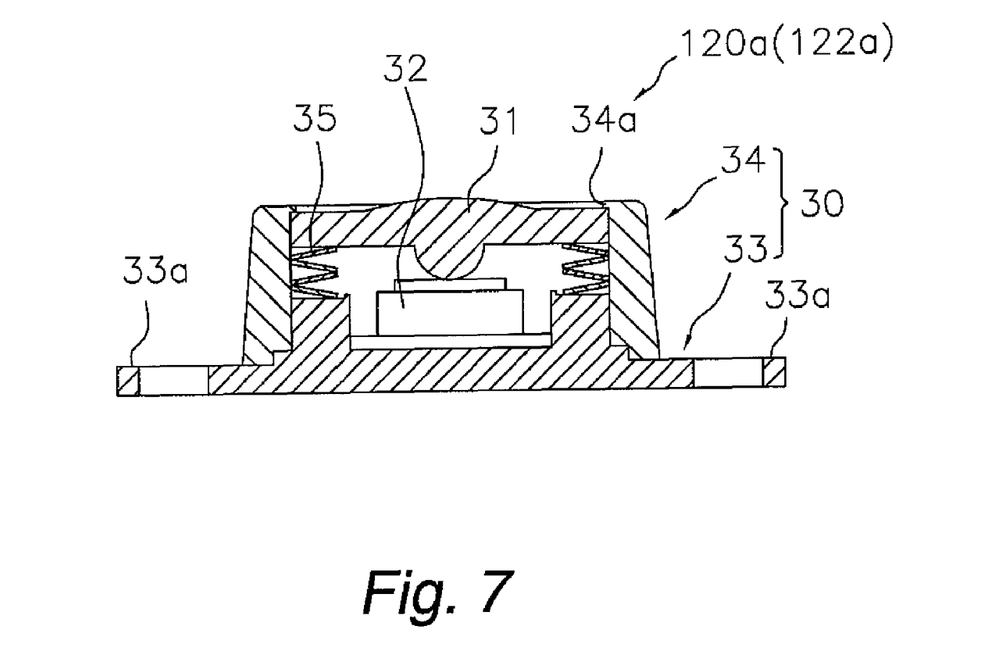
FIG. 7 is a cross sectional view of one the first and fourth switching members of the brake/derailleur operating units as seen along section line 7-7 of FIG. 6.

A space that can accommodate a circuit board including a switching part 32 is formed between the first case member 33 and second case member 34. The operating part 31 has a disk shape in which the central part protrudes slightly from the second case member 34. For example, four dish springs 35 are mounted between the operating part 31 and the first case member 33. As a result, the operating part 31 is driven upward in FIG. 7, so that the first switching member 120a (or fourth switching member 122a) as a whole is constructed as a switch that is ordinarily closed. A circular opening 34a in which the operating part 31 is exposed is formed in the second case member 34. The internal diameter of the opening 34 is smaller than the external diameter of the operating part 31. As a result, the upward movement of the operating part 31 is restricted by the second case member 34.

Figure 8:
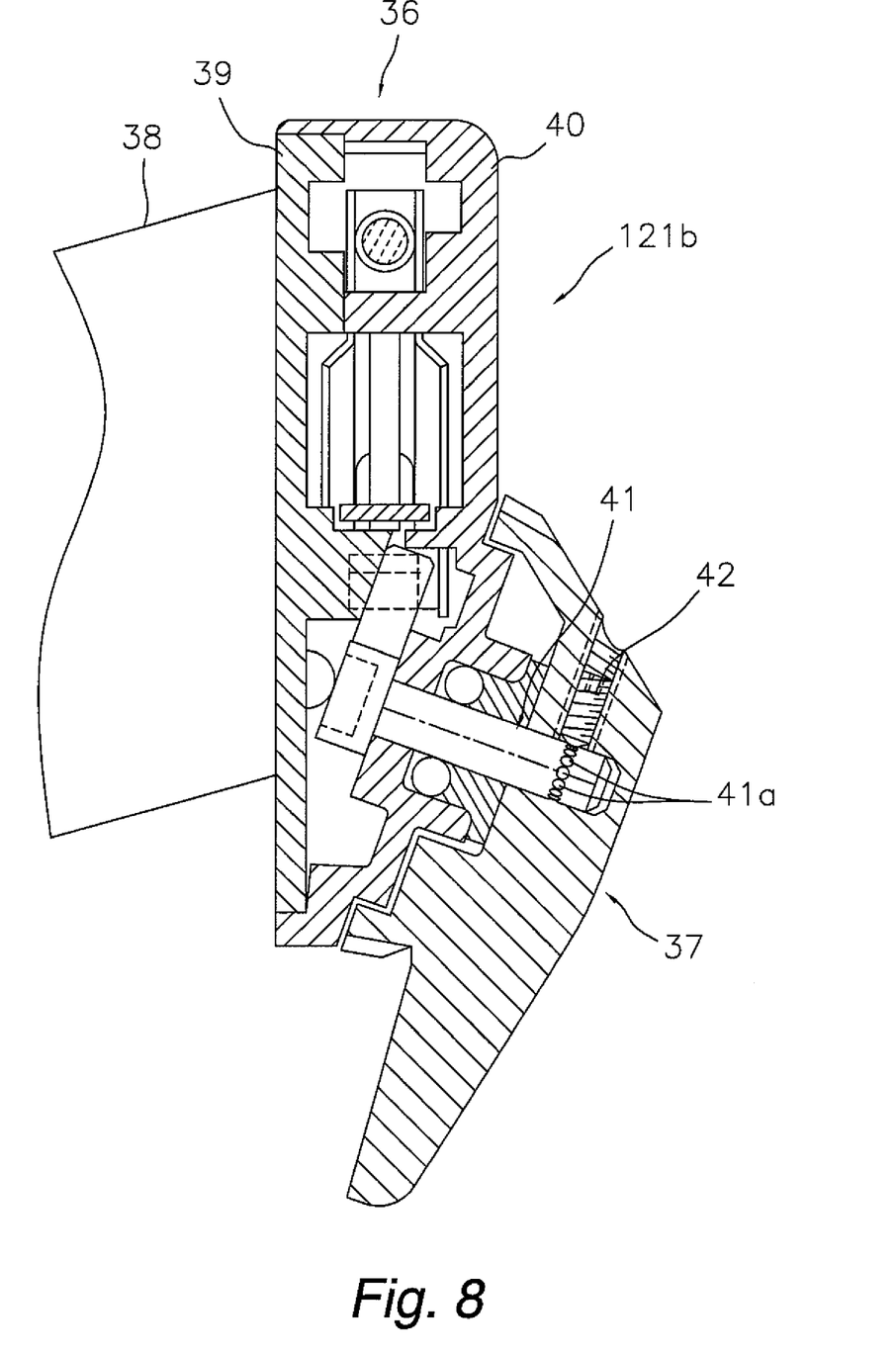
FIG. 8 is a cross sectional view of the auxiliary switching member of the right brake/derailleur operating unit.

As shown in FIG. 8, the lever-type third switching member 121b has an attachment member 36 and a lever-shaped operating part 37. The attachment member 36 is fastened to the curved part 112b of the handlebar main body 112a. The lever-shaped operating part 37 is movably disposed on the attachment member 36. For example, the attachment member 36 comprises a band part 38, a first case member 39 and a second case member 40. The band part 38 can be tightened by a spring. The first case member 39 is formed as an integral unit with the band part 38. The second case member 40 is fastened to the first case member 39. The band part 38 is fastened to the curved part 112b of the handlebar main body 112a so that the attachment position is adjustable. In particular, this part 38 is fastened so that the part can move in the direction of the bend or the circumferential direction of the curved part 112b. One contact constituting a switch is disposed between the first case member 39 and second case member 40.

Furthermore, a swinging shaft 41 is mounted on the second case member 40 so that this shaft is free to pivot. The lever-shaped operating part 37 is fastened to the distal end of this swinging shaft 41. In particular, a fastening screw 42 is used to fixedly attach the lever-shaped operating part 37 to the distal end of the swinging shaft 41. The outer circumferential surface on the distal side of the swinging shaft 41 has a plurality of recessed parts 41a arranged in the circumferential direction. The distal end of the fastening screw 42 has a hexagonal hole in contact with one of the recessed parts 41a. The fastening screw 42 is screwed into the operating part 37 from the outside of the swinging shaft 41 in the radial direction. As a result, the operating part 37 can be fastened in one of a plurality of attachment positions in the circumferential direction of the swinging shaft 41. Specifically, the attachment position of the operating part 37 in the circumferential direction can be adjusted. As shown in FIG. 4, the operating part 37 can swing between an initial position P2, and an "on" position P3 in which the operating part 37 swings to the outside of the handlebar main body 112a from the initial position P2. Furthermore, in the initial state, the initial position P2 of the operating part 37 is disposed along the curved part 112b. However, the attachment position of the operating part 37 can be adjusted according to the physique or preferences of the rider. Furthermore, the overall position and attitude of the third switching member 121b can also be altered by means of the band part 38.

The lever-type second switching member 121a (or fifth switching member 123a) differs from the third switching member 121b only in the construction of the attachment member 46 and the lever length of the operating part 47. The fastening part 46 is fastened to the rear surface of the brake lever 116R (or 116L) by a spring member rather than by a band. Here, this member may be constructed so that the position can be adjusted by means of a slot in the same manner as the first switching member 120a.

As shown in FIG. 4, the operating part 47 is longer than the operating part 37 of the third switching member 121b, and can swing between an initial position P0 and an "on" position P1 in which the operating part swings toward the center (inside) of the handlebar main body 112a from the initial position P0. The attachment attitude of the operating part 47 can be adjusted in the same manner as that of the third switching member 121b.

Furthermore, gearshift display devices 119R and 119L which show, e.g., a liquid crystal display of the gearshift positions of the front and rear derailleurs 97f and 97r are fastened to the upper surfaces of the distal end parts of the base members 117R and 117L.

Figure 9:
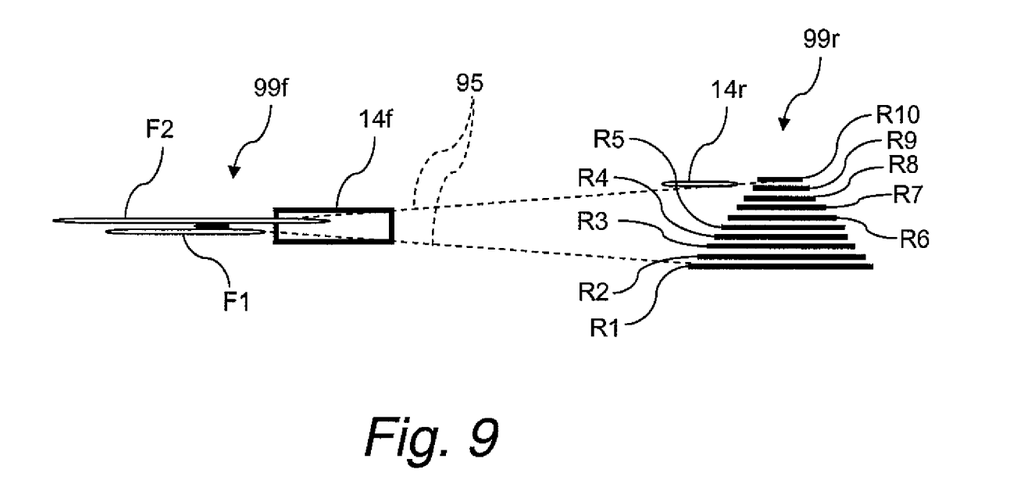
FIG. 9 is a simplified schematic view of a bicycle drive train showing the arrangement of the front and rear sprocket clusters.

As shown in FIG. 9, the front sprocket cluster 99f has two sprockets F1 and F2 that are arranged (separated from each other) along the axial direction of the crank shaft and that have different tooth counts. Similarly, the rear sprocket cluster 99*r* has ten sprockets R1 to R10 that are arranged (separated from each other) along the axial direction of the rear wheel hub shaft (axle) and have different tooth counts. The inner front sprocket F1 has a smaller tooth count than the outer front sprocket F2, i.e., the front sprocket F2 is the higher-gear sprocket. The tooth counts of the rear sprockets decrease successively from the innermost sprocket R1 to the outermost sprocket R10, the outermost sprocket R10 having the smallest tooth count and being the highest gear sprocket. The front and rear derailleurs 97*f* and 97*r* are configured to execute gearshift operations to move the chain 95 to any of the front sprockets F1 and F2 and the rear sprockets R1 to R10. The rider initiates these shift operations by operating the first through fourth gearshift operating parts 120 through 123.

The front derailleur (FD) 97*f* is mounted to a seat tube 102*a* of the frame 102. The front derailleur 97*f* is configured such that it can be controlled electrically. Thus, the front derailleur 97*f* is an electrically driven derailleur configured to guide the chain 95 to one of a plurality of gearshift positions (preferably two gearshift positions). As shown in FIG. 1, the front derailleur 97*f* basically includes a mounting member 12*f*, a chain guide 14*f*, a four-point linkage mechanism 16*f*, an electric drive unit 18*f* and a power supply device 20. The mounting member 12*f* is fastened to the seat tube 102*a* of the frame 102. The chain guide 14*f* is configured and arranged such that it can be moved toward and away from the mounting member 12*f* to move the chain 95. The four-point linkage mechanism 16*f* is arranged to connect the chain guide 14*f* to the mounting member 12*f*. The electric drive unit 18*f* drives the chain guide 14*f* via the four-point link mechanism 16*f*. The power supply device 20 supplies power to the electric drive unit 18*f* and other electrical devices. Thus, the front derailleur 97*f* is operated with the electric drive device 18*f* that is arranged and configured to drive the four-point linkage mechanism 16*f* in such a manner as to move the chain guide 14*f*.

Figure 10:
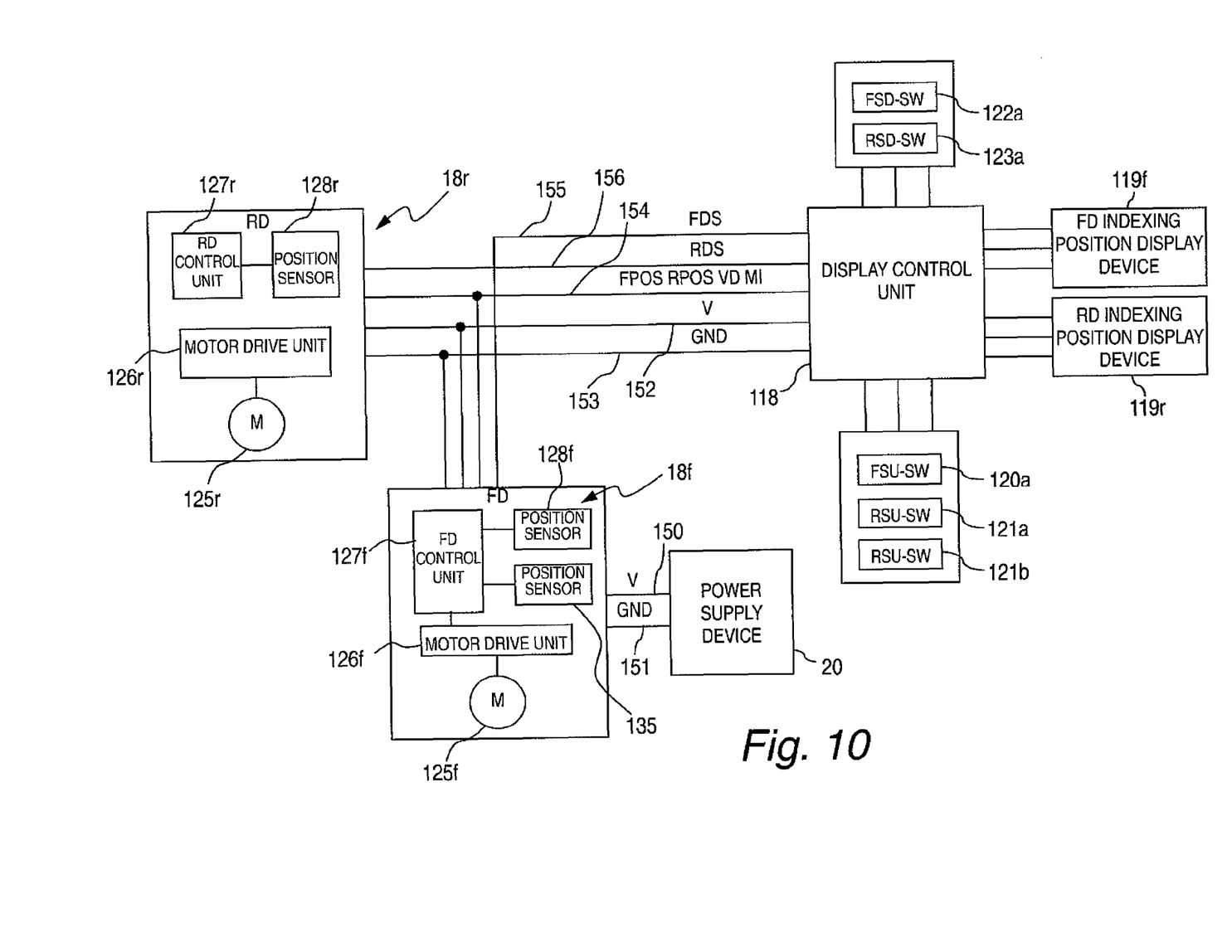
FIG. 10 is a block diagram showing the entire configuration of the gear shifting control system.

As shown in FIG. 10, the electric drive device 18*f* includes a motor 125*f*, a motor drive unit 126*f*, a front control unit 127*f* (FD controller) and a position sensor 128*f*. The motor drive unit 126*f* the front control unit 127*f* (FD controller) and/or a position sensor 128*f* form the front derailleur actuating unit. The motor 125*f* is configured and arranged to drive the front derailleur 97*f*. The motor drive unit 126*f* is configured and arranged to drive the motor 125*f*. The front control unit 127*f* is configured and arranged to control the motor drive unit 126*f* in response to a shift signal from the gearshift operating parts 120 and 122. The position sensor 128*f* is configured and arranged to control sense the gearshift position of the front derailleur 97*f*.

As shown in FIG. 1, the rear derailleur (RD) 97*r* is configured such that it can be controlled electrically to guide the chain 95 to one of a plurality of gearshift positions (preferably ten gearshift positions). The rear derailleur (RD) 97*r* is mounted to a rear portion of a chain stay 102*d* of the frame 102. The rear derailleur 97*r* is configured to move to, for example, to any one of ten gearshift positions in response to gear shifting operations of the gearshift operating parts 121 and 123 and to guide the chain 95 onto the corresponding sprocket of the rear sprocket cluster 99*r*. The rear derailleur 97*r* basically includes a mounting member 12*r*, a chain guide 14*r* and a four-point linkage mechanism 16*r*. The mounting member 12*r* is fastened to the rear portion of the chain stay 102*d* of the frame 102. The chain guide 14*r* is configured and arranged such that it can be moved relative to the mounting member 12*r*. The four-point linkage mechanism 16*r* is arranged to connect the chain guide 14*r* to the mounting member 12*f*. The front derailleur 97*r* is operated with an electric drive unit 18*r* that is arranged and configured to drive the four-point linkage mechanism 16*r* in such a manner as to move the chain guide 14*r*. The power supply device 20 serving as a power source for the front and rear derailleurs 97*f* and 97*r* is mounted to the front derailleur 97.

As shown in FIG. 10, the electric drive unit 18*r* includes a motor 125*r*, a motor drive unit 126*r*, a rear control unit 127*r* for controlling the motor drive unit 126*r*, and a position sensor 128*r* for sensing the gearshift position. The motor 125*r* is configured and arranged to drive the rear derailleur 97*r*. The motor drive unit 126*r* is configured and arranged to drive the motor 125*r*. The rear control unit 127*r* is configured and arranged to control the motor drive unit 126*r* in response to a shift signal from the gearshift operating part 121*r*. The position sensor 128*r* is configured and arranged to sense the gearshift position of the rear derailleur 97*r*.

The front and rear motor drive units 126*f* and 126*r* include motor drivers and deceleration units for decelerating the rotation of the motors 125*f* and 125*r*. The front and rear control parts 127*f*, 127*r* have control circuits containing microcomputers that both have storage units, computation units, and the like; and software separately controls the motor drive units 126*f* and 126*r* in accordance with shift signals outputted from the gearshift operating parts 121*f* and 121*r*. The front and rear position sensors 128*f* and 128*r* are sensors that use rotary encoders or the like, for example, to sense the shifted positions of the derailleurs 97*f* and 97*r*. A voltage sensor 135 senses the power supply voltage of the power supply device 20.

The components of these derailleurs 97*f* and 97*r*, the switching members 120*a*, 121*a*, 121*b*, 122*a* and 123*a* of the gearshift operating parts 120 through 123, the display control unit 118, and the front and rear gearshift display devices 119L and 119R are supplied with power from the power supply device 20 mounted on the front derailleur 97*f*, as shown in FIG. 10. Specifically, a power supply voltage V of about 6 to 8.4 volts (DC) is supplied to the electric drive unit 18*f* of the front derailleur 97*f* from the power supply device 20 via a power supply line 150 and a grounding wire 151. Furthermore, electric power having a power supply voltage V is supplied to the electric drive unit 18*r* of the rear derailleur 97*r* and the display control unit 118 from the electric drive unit 18*f* via a power supply line 152 and grounding wire 153. Moreover, electric power having the power supply voltage V is supplied via the display control unit 118 to the front and rear gearshift display devices 119L and 119R as well as to the switching members 120*a*, 121*a*, 121*b*, 122*a* and 123*a* of the gearshift operating parts 120 through 123. Furthermore, the gearshift position signals FPOS and RPOS of the front and rear position sensors 128*f* and 128*r* are output to the display control unit 118 via a position signal line 154. In the display control unit 118, these signals are converted into display signals, and the gearshift positions of the front and rear derailleurs 97*f* and 97*r* are displayed by the front and rear gearshift display devices 119L and 119R. Voltage data (VD: e.g., three stages of voltage data) is also output to the position signal line 154. Furthermore, the gearshift signals FDS and RDS that are output in accordance with the operation of the switching members 120*a*, 121*a*, 121*b*, 122*a* and 123*a* of the gear shift operating parts 120 through 123 are output to the front and rear derailleurs 97*f* and 97*r* via the display control unit 118 and the respective gearshift signal lines 155 and 156. In actual practice, the gearshift signal line 156 of the gearshift signal RDS is connected to the electric drive unit 18*r* via the electric drive unit 18*f*. Accordingly, the electric drive unit 18*f* of the front derailleur 97*f* is connected to the display control unit 118 via five-core wiring, e.g., via the down tube 102c, and the electric drive unit 18r is connected to the electric drive unit 18f via four-core wiring, e.g., via the chain stay 102d. Accordingly, a connector that connects all of the five-core wiring may also be disposed in the electric drive unit 18f.

Next, an outline of the control processing performed by the respective control parts 127f and 127r will be described.

In the front control unit 127f, the first or third gearshift operating part 120 or 122 is operated when the power supply is switched "on", and a decision is made as to whether the first switching member 120a or fourth switching member 122a has been turned "on". When the first switching member 120a is operated, the front derailleur 97f is operated in the upshifting direction, and when the fourth switching member 122a is operated, the front derailleur 97f is operated in the downshifting direction.

In the rear control unit 127r, the second or fourth gearshift operating part 121 or 123 is operated when the power supply is switched "on", and a decision is made as to whether the second switching member 121a and third switching member 121b or fifth switching member 123a have been turned "on". When the second switching member 121a or third switching member 121b is operated, the rear derailleur 97r is operated in the upshifting direction, and when the fifth switching member 123a is operated, the rear derailleur 97r is operated in the downshifting direction.

In a bicycle 101 having four gearshift operating parts 120 through 123, when the bicycle is ridden with the base members 117R and 117L gripped, the first and third gearshift operating parts 120 and 122 disposed on the insides of the base members 117R and 117L can be operated with the thumbs of the hands, so that upshifting and downshifting operations of the front derailleur 97f can be performed. Furthermore, the second switching member 121a of the second gearshift operating part and the fourth gearshift operating part 123 disposed on the rear surfaces of the brake levers 116R and 116L can be operated with the index fingers or middle fingers of the hands, so that an upshifting or downshifting operation of the rear derailleur 97r can be performed.

Furthermore, when the bicycle is ridden at high speed with the area in the vicinity of the distal end 112d of the handlebar main body 112a gripped, the third switching member 121b of the second gearshift operating part 121 can be operated using the thumb of the hand, so that an upshifting operation of the rear derailleur 97r can be quickly and easily performed even in a state in which the area in the vicinity of the distal end 112d is gripped.

Here, since the front and rear derailleurs 97f and 97r can be caused to perform gearshift operations on the same side of the handlebar main body 112a, it is possible, e.g., to use one side of the handlebar main body 112a for upshifting operations, and to use the other side for downshifting operations. Accordingly, even beginners who are relatively inexperienced in the operations can be prevented from erroneously operating the gearshift operating parts 120 through 123. Furthermore, the present invention has the merit of making gearshift operations even easier for riders who are experienced in the operations.

Furthermore, since the third switching member 121b of the second gearshift operating part 121 is disposed on the curved part close to the distal end 112d of the handlebar main body 112a, an upshifting operation can be performed using the third switching member 121b even in a state where the gripping part in the vicinity of the distal free end 112d of the handlebar main body 112a, i.e., on the underside of the drop-type handlebars, is gripped, as in a sprint immediately before the finish line. Accordingly, an acceleration operation immediately before the finish line can be performed quickly and easily.

Furthermore, since the positions and/or attitudes of the respective gearshift operating parts are made adjustable, the respective gearshift operating parts can be disposed in accordance with the physique or preferences of the rider, so that the feeling of the fit between the body of the rider and the bicycle is improved.

Other Embodiments

In the embodiment described above, pushbutton-type switching members were used in the first and third gearshift operating parts, and lever-type switching members were used in the second and fourth gearshift operating parts. However, the switching members used in the present invention are not limited to these. For example, sliding-type switching members or toggle-type switching members may also be used. Furthermore, ordinarily closed switching members that are turned "on" only when operated are preferred as the switching members.

In the embodiment described above, the first and third gearshift operating parts 120 and 122 were disposed on the distal ends of the base members 117R and 117L. However, it would also be possible to dispose these gearshift operating parts on the base ends of the base members 117R and 117L, preferably the inside surfaces of these base ends. In this case, it is preferable that the operating parts of the switching members be slightly recessed from the surrounding areas, so that the gearshift operating parts are not turned "on" when the base ends of the base members 117R and 117L are gripped.

In the embodiment described above, the respective switching members of the gearshift operating parts were disposed on the brake operating devices, except for the third switching member 121b. However, the present invention is not limited to this option alone. The respective gearshift operating parts may be disposed on either the brake operating devices or the handlebar main body.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle system for controlling a front derailleur and a rear derailleur comprising:
    a handlebar including a central portion, a first end portion on a first lateral side of the central portion and a second end portion on a second lateral side of the central portion;
    a base member with a bicycle handlebar attachment part attached to the first end portion of the handlebar at a first handlebar location on the handlebar;
    a control unit housed within the base member;
    a front derailleur gearshift signal line electrically coupled to the control unit for transferring a front derailleur gearshift signal indicative of the first gearshift operation to the front derailleur;
    a rear derailleur gearshift signal line electrically coupled to the control unit for transferring a rear derailleur gearshift signal indicative of the second gearshift operation to the rear derailleur;
    a first gearshift operating part attached to the first end portion of the handlebar with the first gearshift operating part being electrically wired to the control unit for controlling the front derailleur to selectively perform a first gearshift operation in that the control unit outputs the front derailleur gearshift signal via the front derailleur gearshift signal line in response to operation of the first gearshift operating part; and
    a second gearshift operating part attached to the first end portion of the handlebar with the second gearshift operating part being electrically wired to the control unit for controlling the rear derailleur to selectively perform a second gearshift operation in that the control unit outputs the rear derailleur gearshift signal via the rear derailleur gearshift signal line in response to operation of the second gearshift operating part;
    a third gearshift operating part attached to the handlebar at a second handlebar location on the handlebar that is between a free end of the first end portion of the handlebar and the first handlebar location of the base member, with the third gearshift operating part being electrically wired to the control unit to control one of the front and rear derailleurs to perform a third gearshift operation, with the first handlebar location being spaced from the second handlebar location in an axial direction of the handlebar.

2. The bicycle system according to claim 1, further comprising
    a brake operating device attached to the first end portion of the handlebar with the brake operating device being arranged to perform a braking operation, with the first and second gearshift operating parts being attached to the brake operating device.

3. The bicycle system according to claim 2, wherein the base member is attached to the handlebar,
    the brake operating device includes a brake lever with a base end pivotally attached to the base member,
    the first gearshift operating part is disposed on the base member, and
    the second gearshift operating part is disposed in close proximity to the brake lever.

4. The bicycle system according to claim 1, further comprising
    a brake operating device attached to the first end portion of the handlebar with the brake operating device being arranged to perform a braking operation, with the first and second gearshift operating parts being attached at positions that are separate from the brake operating device.

5. The bicycle system according to claim 1, further comprising
    a brake operating device attached to the first end portion of the handlebar with the brake operating device being arranged to perform a braking operation, with one of the first and second gearshift operating parts being attached to the brake operating device and the other of the first and second gearshift operating parts being attached at a position that is separate from the brake operating device.

6. The bicycle system according to claim 1, wherein
    the first gearshift operating part is arranged to at least perform the first gearshift operation in an upshifting direction of the front derailleur; and
    the second gearshift operating part is arranged to perform the second gearshift operation in the upshifting direction of the rear derailleur.

7. The bicycle system according to claim 1, wherein
    the first gearshift operating part is arranged to only perfoim the first gearshift operation in the upshifting direction of the front derailleur; and
    the second gearshift operating part is arranged to only perform the second gearshift operation in the upshifting direction of the rear derailleur.

8. The bicycle system according to claim 1, further comprising:
    a fourth gearshift operating part attached to the second end portion of the handlebar with the fourth gearshift operating part being arranged to electrically control the front derailleur to selectively perform a fourth gearshift operation; and
    a fifth gearshift operating part attached to the second end portion of the handlebar with the fifth gearshift operating part being arranged to electrically control the rear derailleur to selectively perform a fifth gearshift operation.

9. The bicycle system according to claim 8, wherein
    the fourth gearshift operating part is arranged to at least perform the fourth gearshift operation in a downshifting direction of the front derailleur; and
    the fifth gearshift operating part is arranged to at least perform the fifth gearshift operation in a downshifting direction of the rear derailleur.

10. A bicycle brake/derailleur operating system for controlling a front derailleur and a rear derailleur comprising:
    a handlebar including a central portion, a first end portion on a first lateral side of the central portion and a second end portion on a second lateral side of the central portion;
    a base member with a bicycle handlebar attachment part attached to the first end portion of the handlebar at a first handlebar location on the handlebar;
    a brake lever pivotally connected to the base member;
    a control unit housed within the base member;

a front derailleur gearshift signal line electrically coupled to the control unit for transferring a front derailleur gearshift signal indicative of the first gearshift operation to the front derailleur;

a rear derailleur gearshift signal line electrically coupled to the control unit for transferring a rear derailleur gearshift signal indicative of the second gearshift operation to the rear derailleur;

a first gearshift operating part disposed on one of the base member and the brake lever, the first gearshift operating part being electrically wired to the control unit for controlling the front derailleur to selectively perform a first gearshift operation in that the control unit outputs the front derailleur gearshift signal via the front derailleur gearshift signal line in response to operation of the first gearshift operating part;

a second gearshift operating part disposed on one of the base member and the brake lever, the second gearshift operating part being electrically wired to the control unit for controlling the rear derailleur to selectively perform a second gearshift operation in that the control unit outputs the rear derailleur gearshift signal via the rear derailleur gearshift signal line in response to operation of the second gearshift operating part;

a third gearshift operating part attached to the handlebar at a second handlebar location on the handlebar that is between a free end of the first end portion of the handlebar and the first handlebar location of the base member, with the third gearshift operating part being electrically wired to the control unit to control one of the front and rear derailleurs to perform a third gearshift operation, with the first handlebar location being spaced from the second handlebar location in an axial direction of the handlebar.

11. The bicycle brake/derailleur operating system according to claim 10, wherein
the first gearshift operating part is arranged to at least perform the first gearshift operation in an upshifting direction of the front derailleur; and
the second gearshift operating part is arranged to perform the second gearshift operation in the upshifting direction of the rear derailleur.

12. The bicycle brake/derailleur operating system according to claim 10, wherein
the first gearshift operating part is arranged to only perform the first gearshift operation in the upshifting direction of the front derailleur; and
the second gearshift operating part is arranged to only perform the second gearshift operation in the upshifting direction of the rear derailleur.

13. The bicycle brake/derailleur operating system according to claim 10, wherein
the first gearshift operating part is disposed on the base member; and the second gearshift operating part is disposed in close proximity to the brake lever.

* * * * *